United States Patent [19]
Treffner et al.

[11] 3,844,802
[45] Oct. 29, 1974

[54] BURNED PERICLASE BRICK AND METHOD OF MAKING

[75] Inventors: Walter S. Treffner, Linthicum Heights; Frank P. Filer, Baltimore, both of Md.

[73] Assignee: General Refractories Company, Philadelphia, Pa.

[22] Filed: June 12, 1972

[21] Appl. No.: 261,987

Related U.S. Application Data

[63] Continuation of Ser. No. 16,237, March 3, 1970, abandoned.

[52] U.S. Cl. .................................................. 106/58
[51] Int. Cl. ........................................... C04b 35/04
[58] Field of Search ...................................... 106/58

[56] References Cited
UNITED STATES PATENTS

| | | | |
|---|---|---|---|
| 3,141,790 | 7/1964 | Davies et al. | 106/58 |
| 3,248,240 | 4/1966 | Heuer | 106/58 |

*Primary Examiner*—J. Poer
*Attorney, Agent, or Firm*—Howson and Howson

[57] ABSTRACT

Burned periclase brick is prepared from a size-graded batch of calcined magnesite in which the relatively coarse fraction (+48 mesh) has a $CaO:SiO_2$ weight ratio of from above 2:1 to about 5:1 but the relatively fine fraction (−48 mesh) has a $CaO:SiO_2$ weight ratio of from about 1.5:1 to below 2:1.

10 Claims, No Drawings

BURNED PERICLASE BRICK AND METHOD OF MAKING

BACKGROUND OF THE INVENTION

This is a continuation, of application Ser. No. 16,237 filed Mar. 3, 1970, now abandoned.

Burned periclase bricks are well known and are especially useful as linings in a basic oxygen furnace. Such bricks are prepared by pressing a size-graded mixture of calcined magnesite particles, containing a small amount of an aqueous solution of a preliminary binder like magnesium sulfate, magnesium chloride or a lignosulfonate, into brick form and firing at a temperature of from about 2,900° to about 3,100°F. The use of high-purity magnesite or periclase (e.g., 95% MgO and higher) having a $CaO:SiO_2$ ratio of over 2:1 has been proven advantageous. Such magnesites contain dicalcium silicate as principal impurity which is known to provide an excellent, very refractory bonding phase resulting in very good hot strengths in burned brick using such magnesite. It is also known that even small boron contents can effectively destroy the high-temperature strength of such compositions (e.g., U.S. Pat. No. 3,275,461). Normally the entire batch mix of size-graded calcined magnesite, fines as well as coarses, has the same chemical composition including lime:silica ratio. Some consideration has been given, in the manufacture of burned periclase bricks, to the lime:silica ratio of the material. For example, U.S. Pat. No. 3,275,461 refers to a $CaO:SiO_2$ ratio of at least 2:1 (in conjunction with other features, such as $B_2O_3$ content) as providing better results than $CaO:SiO_2$ ratios below 2:1, such as 1.4:1 to 1.7:1. Consideration has also been given to the $CaO:SiO_2$ ratio in other types of refractories. For example, U.S. Pat. No. 3,141,917 is directed to a tar bonded basic brick in which the fines have a $CaO:SiO_2$ ratio of over 2:1.

It has been found, however, that in the manufacture of burned periclase brick control of the $CaO:SiO_2$ ratio of the fines at from about 1.5:1 to below 2:1 with the $CaO:SiO_2$ ratio of the coarses being from above 2:1 to about 5:1, there is a marked improvement in hot physical properties of the resulting brick, principally in its hot transverse strength and its hot compressive strength.

Therefore, the method of the present invention comprises, in the manufacture of a burned periclase brick wherein a mixture of relatively coarse calcined magnesite having a particle size such that substantially all thereof passes a 3-mesh screen and is retained on a 48-mesh screen and of relatively fine calcined magnesite having a particle size such that substantially all thereof passes through a 48-mesh screen and the relatively coarse calcined magnesite makes up from about 50 to about 80 percent by weight, of said mixture, is pressed into brick form and fired at a temperature of at least about 2,900°F., the improvement wherein said relatively coarse calcined magnesite has a $CaO:SiO_2$ weight ratio of from above 2:1 to about 5:1 but the relatively fine calcined magnesite has a $CaO:SiO_2$ weight ratio of from about 1.5:1 to below 2:1.

The resulting brick thus comprises a burned periclase brick in which the defined mixture of calcined magnesite particles are ceramically bonded together.

It has been found that unexpected additional benefits of dicalcium silicate bonding can be obtained when at least a portion of the dicalcium silicate is formed in situ during burning the brick. This is preferably done at the boundaries between the relatively coarse and the relatively fine particles in the brick by changing the chemistry, and consequently the composition, of the accessory mineral phases of the relatively fine particles of the brick thus creating a chemical composition gradient between the relatively coarse and the relatively fine fractions of the brick. The constituents of the more siliceous fine particles will react with the constituents of the less siliceous coarse particles forming, during the firing of the brick, refractory dicalcium silicates thus forming a bond of a high hot strength between the relatively coarse and the relatively fine particles of the brick. The reaction also forms some secondary periclase and it is believed also to promote direct periclase-to-periclase bonding thus further contributing to increased high-temperature strength.

Calcined magnesite is the basic component of the bricks prepared according to the present invention. The calcined magnesite will generally have an MgO content of at least 90 percent and preferably at least 95 percent, the balance being small and varying amounts of lime (CaO) and silica ($SiO_2$) and miscellaneous oxides of aluminum, iron, manganese, etc. As is customary practice, the batch mix of calcined magnesite will be size graded to provide a relatively coarse fraction ("coarses") and a relatively fine fraction ("fines"). The relatively coarse fraction has a particle size distribution such that substantially all thereof passes through a 3-mesh screen and is retained on a 48-mesh screen, whereas the relatively fine fraction has a particle size such that substantially all thereof passes through a 48-screen. Mesh sizes herein refer to Tyler mesh series. The coarse fraction will make up from about 50 to 80 percent, preferably from about 60 to about 70 percent, by weight, of the mixture of coarses and fines.

According to the present invention the relatively fine fraction will have a $CaO:SiO_2$ weight ratio lower than that of the relatively coarse fraction. Thus, the relatively coarse fraction will have a $CaO:SiO_2$ ratio of from above 2:1 to about 5:1. The relatively fine fraction, on the other hand, will have a $CaO:SiO_2$ ratio of from about 1.5:1 to below 2:1, with a $CaO:SiO_2$ ratio of about 1.6 – 1.85:1 being particularly preferred. The relatively fine fraction having the stated $CaO:SiO_2$ ratio is preferably the natural ball mill fines of a calcined magnesite having the desired low $CaO:SiO_2$ ratio so that no adjustment is necessary. However, if the principal fines material available has a $CaO:SiO_2$ ratio above the desired level, its $CaO:SiO_2$ ratio can be adjusted to the desired lower level by mixing with it a fine silica-bearing material having a very low $CaO:SiO_2$ ratio such as a silica-rich calcined magnesite, talc, serpentine, olivine, silica fines, or the like. On the other hand, relatively fine calcined magnesite having a $CaO:SiO_2$ below the desired level can have its ratio adjusted upwardly by mixing with it a fine lime-bearing material having a high $CaO:SiO_2$ ratio such as a lime-rich calcined magnesite, calcium carbonate, dolomite or the like.

The nature and amount of $CaO:SiO_2$ ratio adjustment in the fines, if resorted to, may be governed by the particular improvement desired. Thus, optimum improvement in hot transverse strength is achieved at a $CaO:SiO_2$ ratio of about 1.6:1 when the calcined magnesite used in preparing (ball milling) the fines has that natural ratio. Satisfactory hot transverse strengths can also be achieved by adjusting downwardly a $CaO:SiO_2$ ratio higher than desired unless the latter is well over 2:1. However, even in this latter case, firing the brick at higher than usual temperatures, discussed more in detail hereinafter, can afford an improvement in hot transverse strength. High hot compressive strengths are obtained with fines having $CaO:SiO_2$ ratios of 1.6 – 1.9:1 whether they be natural (virgin) fines or fines of an initially higher $CaO:SiO_2$ which have had their $CaO:SiO_2$ ratio adjusted downwardly. The use of firing temperatures higher than usual further improves the hot compressive strength.

Once the batch mix of size graded calcined magnesite having the defined $CaO:SiO_2$ ratios in the coarse and fine fractions has been prepared, standard burned brick-making practice may be followed. Thus, a small amount of an aqueous temporary or preliminary binder may be mixed with the calcined magnesite, and the damp mixture is pressed into brick form. The bricks may then be fired following conventional practice at a temperature of from about 2,900° to about 3,100°F., as in a tunnel kiln. However, as mentioned above, further improvement in hot strengths can be realized by firing at temperatures higher than usual, namely to temperatures of from about 3,100° to about 3,300°F.

The present invention will be more readily understood from a consideration of the following specific examples which are given for the purpose of illustration only and are not intended as limiting the scope of the invention in any way.

EXAMPLE 1

In this Example bricks are prepared from a batch mix of 65 parts, by weight, of coarse calcined magnesite and 35 parts, by weight, of fine calcined magnesite. The coarse fraction had a particle size distribution as follows:

| | | |
|---|---|---|
| +4 | mesh | 0.3% |
| +6 | do. | 14.6 |
| +8 | do. | 39.5 |
| +10 | do. | 65.8 |
| +14 | do. | 80.3 |
| +20 | do. | 89.9 |
| +28 | do. | 95.6 |
| −28 | do. | 4.4 | and an oxide analysis as follows:

| | |
|---|---|
| MgO | 96.30% |
| CaO | 2.46% |
| $SiO_2$ | 0.99% |
| oxides of Fe, Al, Mn, etc. | 0.25% |

The fine fraction had a particle size distribution as follows:

| | | |
|---|---|---|
| +48 | mesh | 2.4% |
| +65 | do. | 8.5 |
| +100 | do. | 20.7 |
| +200 | do. | 38.8 |
| +325 | do. | 46.7 |
| −325 | do. | 53.3 |

The fine fraction differed, as set forth in Table I, in terms of $CaO:SiO_2$ ratio. Where the $CaO:SiO_2$ was adjusted upwardly, fine calcium carbonate powder was added until the desired $CaO:SiO_2$ ratio was provided; and where the $CaO:SiO_2$ ratio was adjusted downwardly a fine calcined magnesite having a low $CaO:SiO_2$ ratio was added until the desired ratio was reached.

The bricks were prepared by mixing the grain mix with 1 percent of a 50 percent aqueous solution of lignosulfonate and 1.1% $H_2SO_4$ (as dilute sulfuric acid) and pressing the damp mixture at 12,000 psi. The bricks were then fired at 3,000°F. in a tunnel kiln following which physical properties were measured as set forth in Table 1. The results are tabulated as follows:

Table I

Periclase Brick
Variation in Lime to Silica Ratio of Fines

3000°F Tunnel Kiln Burn

| Lime to Silica Ratio of Fines: | 1.61 | | | | 1.83 | | | |
|---|---|---|---|---|---|---|---|---|
| Ratio of Fines Adjusted From: | 2.65 | 2.15 | 1.83 | * | 2.65 | 2.15 | * | 1.61 |
| Bulk Density, oz./in.³ | 1.71 | 1.71 | 1.72 | 1.70 | 1.70 | 1.71 | 1.72 | 1.70 |
| g/cc | 2.96 | 2.96 | 2.98 | 2.94 | 2.94 | 2.96 | 2.98 | 2.94 |
| Modulus of Rupture, p.s.i. | 1840 | 1755 | 2120 | 1760 | 1970 | 1855 | 1960 | 2030 |
| Cold Crushing Strength, p.s.i. | 6110 | 4720 | 5070 | 6775 | 4280 | 4250 | 5155 | 5160 |
| Modulus of Rupture at 2700°F, p.s.i. | 1285 | 1325 | 1610 | 1660 | 1290 | 1200 | 1195 | 1125 |
| Compressive Strength at 2800°F, p.s.i. | 2785 | 2095 | 3305 | 2620 | 2830 | 2435 | 2865 | 2425 |
| Porosity, Open, % | 15.2 | 15.4 | 14.8 | 16.7 | 15.7 | 15.0 | 14.7 | 16.4 |
| Lime to Silica Ratio of Fines: | 2.15 | | | | 2.65 | | | |
| Ratio of Fines Adjusted From: | 2.65 | * | 1.83 | 1.61 | * | 2.15 | 1.83 | 1.61 |
| Bulk Density, oz./in.³ | 1.70 | 1.70 | 1.71 | 1.70 | 1.70 | 1.71 | 1.70 | 1.69 |
| g/cc | 2.94 | 2.94 | 2.96 | 2.94 | 2.94 | 2.96 | 2.94 | 2.92 |
| Modulus of Rupture, p.s.i. | 1770 | 1340 | 1770 | 1835 | 1805 | 1810 | 1780 | 1715 |
| Cold Crushing Strength, p.s.i. | 3980 | 3720 | 3980 | 5155 | 3805 | 4365 | 3700 | 5075 |
| Modulus of Rupture at 2700°F, p.s.i. | 1245 | 995 | 1025 | 1000 | 1130 | 825 | 1240 | 1045 |
| Compressive Strength at 2800°F, p.s.i. | 2230 | 1780 | 2705 | 1920 | 2305 | 1935 | 1935 | 1790 |
| Porosity, Open, % | 15.6 | 15.5 | 15.6 | 16.7 | 15.9 | 15.3 | 14.9 | 16.3 |

*Natural ball mill fines (no adjustment)

EXAMPLE 2

In this Example, the procedure of Example 1 was followed except that the bricks were fired at 3,170°F. in a laboratory kiln.

The results are tabulated as follows:

Table 2

Periclase Brick
Variations in Lime to Silica Ratio of Fines
3170°F Laboratory Burn

| Lime to Silica Ratio of Fines: | 1.61 | | | | 1.83 | | | |
|---|---|---|---|---|---|---|---|---|
| Ratio of Fines Adjusted From: | 2.65 | 2.15 | 1.83 | * | 2.65 | 2.15 | * | 1.61 |
| Bulk Density, oz./in.³ | 1.72 | 1.72 | 1.72 | 1.71 | 1.71 | 1.72 | 1.71 | 1.71 |
| g/cc | 2.98 | 2.98 | 2.98 | 2.96 | 2.96 | 2.98 | 2.96 | 2.96 |
| Modulus of Rupture, p.s.i. | 2485 | 2550 | 2450 | 2790 | 2740 | 2570 | 2370 | 2660 |
| Cold Crushing Strength, p.s.i. | 5545 | 4715 | 4550 | 6510 | 5420 | 4970 | 4660 | 5770 |
| Modulus of Rupture at 2700°F, p.s.i. | 1740 | 1450 | 1845 | 2040 | 1725 | 1450 | 1835 | 1765 |
| Compressive Strength at 2800°F, p.s.i. | 4275 | 4240 | 2970 | 3535 | 4975 | 4270 | 4080 | 3415 |
| Porosity, Open, % | 15.4 | 15.0 | 15.1 | 16.3 | 15.1 | 14.8 | 15.4 | 16.3 |
| Lime to Silica Ratio of Fines: | 2.15 | | | | 2.65 | | | |
| Ratio of Fines Adjusted From: | 2.65 | * | 1.83 | 1.61 | * | 2.15 | 1.83 | 1.61 |
| Bulk Density, oz./in.³ | 1.71 | 1.71 | 1.71 | 1.70 | 1.70 | 1.72 | 1.71 | 1.69 |
| g/cc | 2.96 | 2.96 | 2.96 | 2.94 | 2.94 | 2.98 | 2.96 | 2.92 |
| Modulus of Rupture, p.s.i. | 2805 | 1875 | 2370 | 2245 | 2240 | 2110 | 2220 | 2260 |
| Cold Crushing Strength, p.s.i. | 5350 | 4010 | 4660 | 4810 | 4385 | 3495 | 3370 | 4850 |
| Modulus of Rupture at 2700°C, p.s.i. | 1560 | 1535 | 1530 | 1350 | 1220 | 1245 | 1230 | 1225 |
| Compressive Strength at 2800°C, p.s.i. | 3670 | 3695 | 4080 | 3030 | 2785 | 3075 | 3150 | 2475 |
| Porosity, Open, % | 15.4 | 15.6 | 15.4 | 16.3 | 16.4 | 15.0 | 15.4 | 16.6 |

*Natural ball mill fines (no adjustment)

What is claimed is:

1. In the manufacture of a burned periclase brick having a MgO content of at least 90 percent by weight wherein a mixture of relatively coarse calcined magnesite having a particle size such that substantially all thereof passes through a 3-mesh screen and is retained on a 48-mesh screen and of relatively fine fraction having a particle size such that substantially all thereof passes through a 48-mesh screen and the relatively coarse calcined magnesite makes up from about 50 to about 80 percent, by weight, of said mixture, is pressed into brick form and fired at a temperature of at least 2,900°F., the improvement wherein said relatively coarse calcined magnesite has a $CaO:SiO_2$ weight ratio of from above 2:1 to about 5:1 and the relatively fine fraction has a $CaO:SiO_2$ weight ratio of from about 1.5:1 to below 2:1.

2. The method of claim 1 wherein said relatively fine calcined magnesite has a $CaO:SiO_2$ weight ratio of from about 1.6:1 to about 1.85:1.

3. The method of claim 1 wherein said relatively fine calcined magnesite has a $CaO:SiO_2$ weight ratio of about 1.6:1.

4. The method of claim 1 wherein said relatively fine calcined magnesite consists essentially of natural ball mill fines of a calcined magnesite.

5. The method of claim 2 wherein said relatively fine calcined magnesite consists essentially of natural ball mill fines of a calcined magnesite.

6. The method of claim 1 wherein said brick is fired at a temperature of from about 3,100° to about 3,300°F.

7. The method of claim 2 wherein said brick is fired at a temperature of from about 3,100° to about 3,300°F.

8. In a burned periclase brick having a MgO content of at least 90 percent by weight wherein calcined magnesite particles are ceramically bonded together, the calcined magnesite being a mixture of a relatively coarse fraction having a particle size such that substantially all thereof passes through a 3-mesh screen and is retained on a 48-mesh screen and of a relatively fine fraction having a particle size such that substantially all thereof passes through a 48-mesh screen and the relatively coarse fraction makes up from about 50 to about 80 percent, by weight, of the mixture, the improvement wherein said relatively coarse fraction has a $CaO:SiO_2$ weight ratio of from above 2:1 to about 5:1 but the relatively fine fraction has a $CaO:SiO_2$ weight ratio of from about 1.5:1 to below 2:1.

9. The brick of claim 8 wherein said relatively fine fraction has a $CaO:SiO_2$ weight ratio of from about 1.6:1 to about 1.85:1.

10. The brick of claim 9 wherein said relatively fine fraction has a $CaO:SiO_2$ weight ratio of about 1.6:1.

* * * * *